Dec. 14, 1943.   P. O. CARTUN   2,336,529
BASE FOR ELECTRIC LAMPS AND THE LIKE
Filed Aug. 27, 1942   2 Sheets-Sheet 1

Inventor:
Paul O. Cartun,
by John H. Anderson
His Attorney.

Dec. 14, 1943.   P. O. CARTUN   2,336,529
BASE FOR ELECTRIC LAMPS AND THE LIKE
Filed Aug. 27, 1942   2 Sheets-Sheet 2
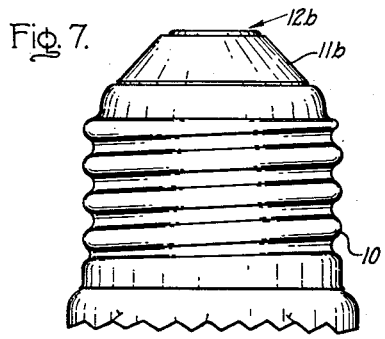
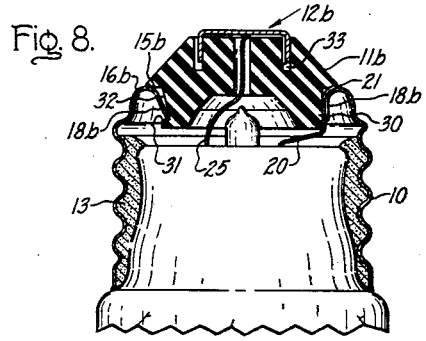
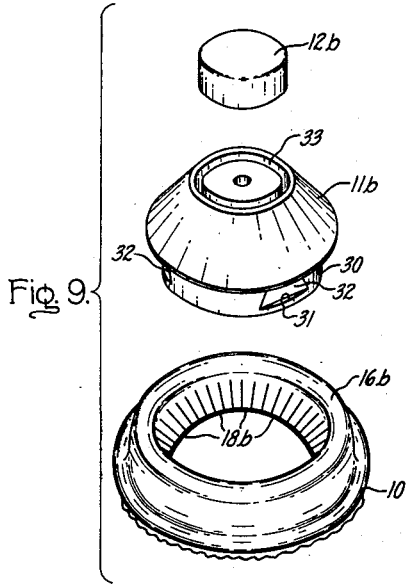
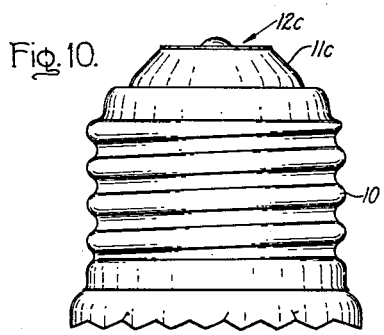
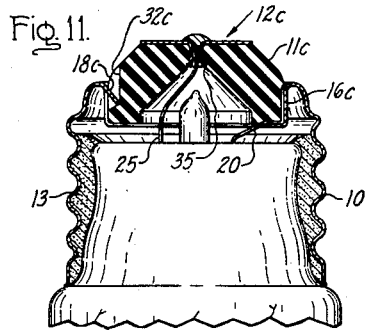
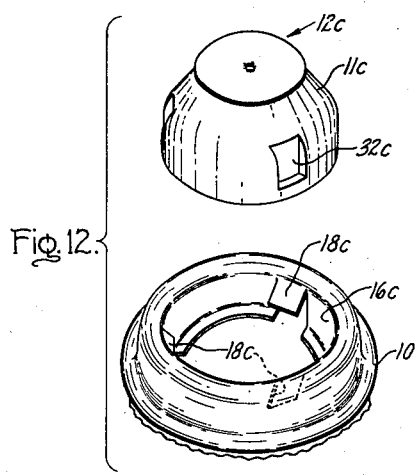
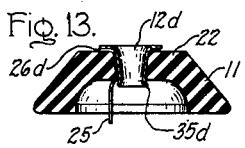
Inventor:
Paul O. Cartun,
by John H. Anderson
His Attorney.

Patented Dec. 14, 1943

2,336,529

UNITED STATES PATENT OFFICE 2,336,529

BASE FOR ELECTRIC LAMPS AND THE LIKE

Paul O. Cartun, Cleveland Heights, Ohio, assignor to General Electric Company, a corporation of New York Application August 27, 1942, Serial No. 456,351

9 Claims. (Cl. 176—32)

This invention relates to basing the bulbs or envelopes of electrical devices, including incandescent lamps as well as discharge lamps and other discharge devices of various kinds, and is concerned with the construction of bases and their contact means or terminals, as well as with their electrical connections to the lamps or other such devices. The invention permits of manufacturing the base parts by inexpensive methods of mass production, facilitates and cheapens the basing operation, and makes it possible to dispense with soldering or welding in making the electrical connections. In forms of embodiment of the invention here shown and described, the base is put together on the snap fastener principle. The invention is hereinafter explained with particular reference to bases of the Edison and kindred screw and center contact types, though it is also applicable to bases of very different types from this, such as the double end-contact bayonet type, for example.

Other features and advantages of the invention will become apparent from the description of species and forms of embodiment, and from the drawings.

In the drawings, Fig. 1 is a side view of a screw type of base embodying the snap fastener principle according to my invention in one form of construction, a portion of an electric lamp bulb to which the base is applied being also shown; Fig. 2 shows an axial section through this base, with a portion of the lamp bulb B in side elevation; and Fig. 3 is an exploded view of the principal base parts, the screw shell and insulator being shown tilted one way, while the end contact is oppositely tilted.

Figure 1:
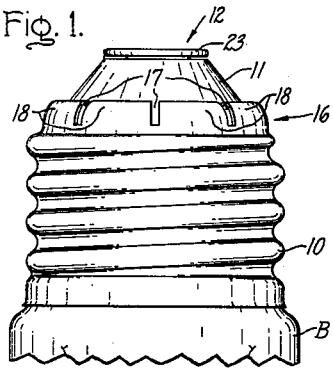
Figure 2:
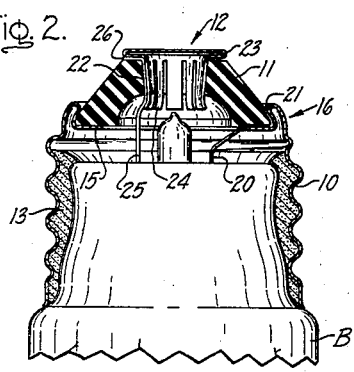
Figure 3:
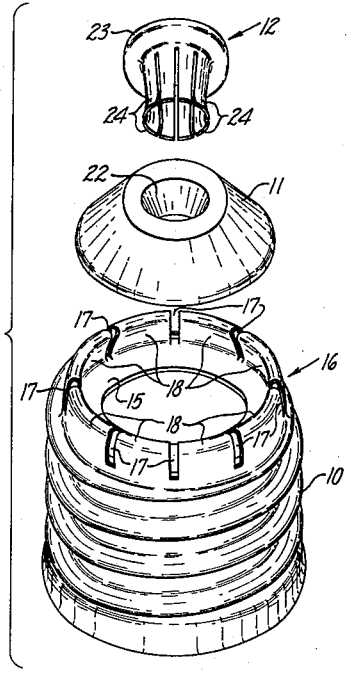
Fig. 3A is a tilted view illustrating a modified form of one of the parts shown in Fig. 3.

Figs. 7, 8, and 9 are views generally similar to Figs. 1, 2, and 3, but illustrating other modifications.

Figs. 10, 11, and 12 are views generally similar to Figs. 1, 2, and 3 illustrating yet other modifications.

Fig. 13 is a sectional view of an insulator like that of Figs. 1-3 with still another form of end or center contact.

Figs. 1, 2, and 3 illustrate the application of my invention to an ordinary type of Edison screw base comprising a metal skirt in the form of a screw shell 10 with a button-shaped insulative body 11 in the outer end thereof, such as glass, hard rubber, molded plastic, or indurated fiber. The end body 11 carries an end or center contact 12. Ordinary basing cement 13 may be used to secure the base shell or skirt 10 around the neck of an incandescent lamp bulb B in the usual way.

As shown in Fig. 2, the insulative body 11 is seated against an internal seating shoulder or flange 15 in the shell 10, at the outer side of this shoulder, and is peripherally embraced and gripped by the end portion 16 of the shell, with a snap action. This shell portion 16 and the seat 15 are shown in Figs. 2 and 3 as formed by doubling the sheet metal of the shell 10 back thereinto, and flanging its extreme margin. The general conformation of the shell portions 15, 16 resembles that shown in U. S. Patent 2,184,269 to Carl A. Brown and Clarence E. Hahn; but there is an important difference: viz., the shell portion 16 here shown does not rigidly and permanently secure the insulator 11, but holds it resiliently and yieldingly, in a manner similar to the snap action of an ordinary glove fastener. This is made possible by segmentation of the doubled annular flange or ridge 16, by radial slots 17, into a multiplicity of spring locking fingers 18 that are free to separate in flexing outward. As shown in Fig. 3, the slots 17 do not extend or cut through the seat flange 15, so that the latter forms an annular interconnection of the root ends of the inner portions of the spring fingers 18, though this is not essential. The outer surface of the insulator 11 is shown conically beveled, with a rounded corner at its periphery, and the ends of the spring fingers 18 overhang inward somewhat to snap over and grip the insulator securely when the latter is pushed home to the seat 15.

The connection of a corresponding lamp lead 20 to the screw shell 10 may be made by simply passing the lead through the shell, when the latter is placed on the neck of the lamp bulb B, and then bending it aside, so that it will be gripped between the shell portion 15 or 16 and the insulator 11, when the latter is snapped into place, by the elastic snap action. Afterward, the lead 20 may be cut off about as shown at 21. Even if the wire 20 should lie in one of the slots 17, it will still be firmly and elastically pressed against the seat 15 by the snap action.

As shown in Figs. 2 and 3, the end contact 12 is snap-fastened into the insulator 11, which has a central recess or hole 22 for this purpose, preferably beveled inward from the flat outer end surface of the insulator. The contact 12 may consist of a disc-like head 23 having an internal hollow shank that engages in and around the opening 22, and is slit into a number of spring locking fingers 24 shown with external beveled shoulders at their free lower ends, for snapping outward behind the shoulder of the insulator opening 22 when the contact is pushed home into the opening. The contact 12 may be formed of sheet metal by a die-pressing and drawing operation, the margin of its head 23 being formed by doubling under the sheet metal as shown in Fig. 2.

The connection of a lamp lead 25 to the contact 12 may be made by simply passing the lead through the insulator 11 when the latter is put in place in the screw shell 10 and bending it aside, so that it will be gripped between the disc contact 12 and the flat outer surface of the insulator, when the contact is snapped into place, by the elastic snap action. Afterward, the lead 25 may be cut off about as indicated at 26. Even if the wire 25 should lie between two of the spring fingers 24, it will still be firmly and elastically gripped against the underside of the disc 12 by the snap action.

Figure 3A:
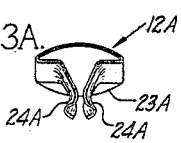

Fig. 3A illustrates a modified form of end contact 12A comprising a sheet metal disc head 23A with spring locking fingers 24A, 24A formed by folding under the disc 23A two diametrally opposite strips of the sheet metal of which the disc is made, and also bending these strips downward away from the disc. The fingers 24A, 24A may be stiffened by longitudinally embossing them to conform to the rounded opening 22 of the part 11, and may have their ends bent and beveled outward to form shoulders for snapping behind the shoulder of the opening 22. Such a part 12A can be readily fabricated from strip sheet metal by die-punching, bending, and embossing operations.

Figure 4:
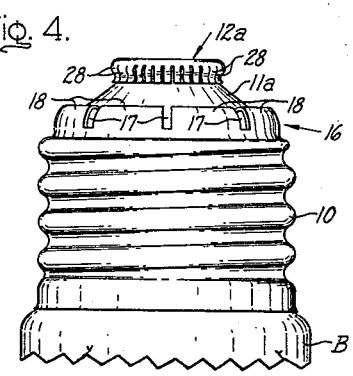
Figs. 4 and 5 are views similar to Figs. 1 and 2 showing a base with a different form of snap-fastened end contact from that shown in Figs. 1 to 3.
Figure 6:
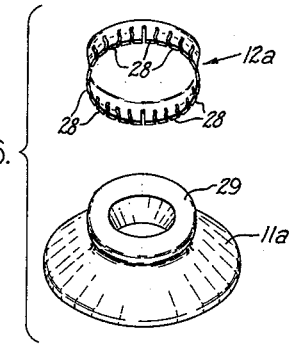
Fig. 6 is an exploded view similar to Fig. 3, but showing only the insulator and the end contact.
Figure 5:
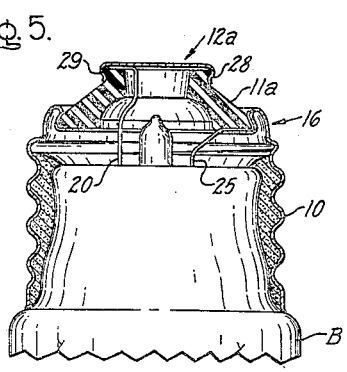

Figs. 4 to 6 illustrate a different form of end contact 12a, with a correspondingly different snap action. The end contact 12a resembles a cap or an inverted sauce dish with its wall somewhat undercut, and divided by slits into a multitude of spring locking fingers 28, while the top corner of the insulator 11a is rounded and annularly undercut so that these fingers can snap over the resulting button-like head 29, Figs. 5 and 6, around the opening in the insulator. The connection of the lamp lead 25a to the contact 12a may be essentially like that of lead 25 to contact 12, Figs. 1 to 3.

Both of these constructions allow the parts 12 or 12a and 11 or 11a to be readily detached from one another and from the part 10.

Figs. 7, 8, and 9 illustrate a variation in the snap connection of the insulator to the screw shell. Here the insulation 11b has a stop shoulder 15b that abuts and seats against the end portion 16b of the screw shell 10b, and a reduced portion 30 that enters amongst the many spring locking fingers 18b into which the inturned sheet metal shell end is divided. The ends of these spring fingers 18b are not shown annularly interconnected as in Figs. 1 to 6, but free for independent elastic flexure. The reduced insulator portion 30 is itself reductively shouldered at 31 for latching snap engagement with the ends of the spring fingers 18b. In the present instance, the locking shoulder feature 31 does not extend continuously all around the insulator portion 30, but is localized at a plurality of notches 32 "sliced" into the periphery of the portion 30, three such notches being shown. The engagement of the ends of a few spring fingers 18b against the shoulder 31 afforded by each notch 32 suffices to hold the insulator 11b securely.

As shown in Figs. 7, 8, and 9, the center contact 12b is not snap fastened, but consists of a mere cap whose annular wall is wedged fast in a corresponding annular groove 33 in the insulator 11b, as shown in Patent No. 2,047,043, granted July 7, 1936, to R. F. Strickland, and in Patent No. 2,066,317, granted January 5, 1937, to H. D. Blake and W. J. Geiger. The lamp leads 20, 25 may be secured and connected to the screw shell 10b and center contact 12b as illustrated in Fig. 2 and in the said Patent No. 2,047,043, respectively.

Figs. 10, 11, and 12 illustrate another variation in the snap connection of the insulator to the screw shell. Instead of having its portion 16c slit up into a multitude of spring fingers, this portion is a plain annular wall broken only by the punching out of a few isolated spring fingers 18c (three being shown) whose free lower ends are bent inward to snap into corresponding bevel-shouldered notches 32c in the insulator 11c when the latter is put in place and pushed home. As shown in Fig. 10, the center contact 12c is not snap-fastened like those in Figs. 1 to 6, but is a mere eyelet with flared end 35 molded into the insulation 11c as usual in lamp bases, and connection of the corresponding lead 25 to this contact 12c may be made by soldering or welding after the lead has been passed through the contact. However, it will be understood that other forms of end contact might be used with the insulator 11c, such as snap-on types like those of Figs. 1 to 6, for instance.

Fig. 13 shows an insulator 11 like that in Figs. 1-3 and a center contact somewhat resembling the contact 12c in Figs. 10-12, consisting of an eyelet or tubular rivet 12d having a flat outer flange or head, and inserted in the flaring center hole 22 of the insulator and having its inner end expanded to a flaring inner flange or head 35d that secures it in place. The eyelet or rivet 12d may be put in after the insulator 11 has been snapped into the screw shell 10 already cemented on the lamp bulb B, Figs. 1 and 2, and may then be flanged at 35d by means of a suitable instrument inserted through the eyelet or rivet. Instead of extending through the eyelet or rivet as in Fig. 11, the lead wire 25 is passed through the insulator opening 22 before the rivet 12d is put in place, and is clamped between the outer rivet head and the top surface of the insulator 11 essentially as in Fig. 2, besides being wedged between the conical surface of the insulator and the corresponding surface of the rivet shank. The wire 25 is finally cut off at 26d close to the edge of the outer rivet head, essentially as in Fig. 2.

Throughout the drawings, homologous parts are marked with the same reference numerals in order to dispense with repetitive description, distinctive letters being added where such distinction of modified parts appears necessary.

What I claim as new and desire to secure by Letters Patent of the United States is:

1. In a base construction for electric lamps and similar devices, the combination with a metal shell having its outer end closed by a button-shaped base end insulator having an apertured engagement part, of a base end contact having a snap fastener for snap interlock with said engagement part.

2. In a base construction for electric lamps and similar devices, the combination with a button-shaped base end insulator, of a metal base shell having a snap fastener at its outer end for embracing snap interlock with the periphery of said insulator.

3. In a base construction for electric lamps and similar devices, the combination with an apertured button-shaped base insulator, of a base shell having a snap fastener at its outer end for embracing snap interlock with the periphery of said insulator, and an end contact having a snap fastener for snap interlock around the aperture in said insulator.

4. In a base construction for electric lamps and similar devices, the combination with an apertured button-shaped base insulator, of an end contact having a snap fastener for snap interlock around the aperture in said insulator, and a base shell having an internal seat for said insulator at its outer end and superjacent snap fastener means for embracing snap interlock with the periphery of said insulator.

5. In a base construction for electric lamps and similar devices, the combination with an apertured button-shaped base insulator, of an end contact having a snap fastener for snap interlock around the aperture in said insulator, and a base shell having at its outer end a series of internal resilient locking fingers for embracing snap interlock with the periphery of said insulator, and seating means for said insulator carried by the inner ends of said locking fingers.

6. In a base construction for electric lamps and similar devices, the combination with an apertured button-shaped base insulator, of an end contact having a snap fastener for snap interlock around the aperture in said insulator, and a base shell having its outer end doubled inward and flanged to fit around and seat the periphery of said insulator, and slit to give the doubled portion resilience for snap interlock on said insulator periphery.

7. In an electric lamp comprising a bulb having a neck portion with lead wires extending therefrom, a base comprising a cylindrical metal shell with its inner end circumposed about and secured to the neck of the bulb and having snap fastener means at its outer end, and a button-shaped insulator secured to the said outer end of the shell by a snap interlock engagement of its periphery with the said snap fastener means, one of said lead wires being clamped between said insulator and said outer end of the shell.

8. In an electric lamp comprising a bulb having a neck portion with lead wires extending therefrom, a base comprising a cylindrical metal shell with its inner end circumposed about and secured to the neck of the bulb and having its outer end retroverted with snap fastener means formed in said retroverted outer end, and a button-shaped insulator secured to the said outer end of the shell by a snap interlock engagement of its periphery with the said snap fastener means, one of said lead wires being clamped between said insulator and said outer end of the shell.

9. In an electric lamp comprising a bulb having a neck portion with lead wires extending therefrom, a base comprising a cylindrical metal shell with its inner end circumposed about and secured to the neck of the bulb and having snap fastener means at its outer end, and an apertured button-shaped insulator secured to the said outer end of the shell by a snap interlock engagement of its periphery with the said snap fastener means, one of said lead wires being clamped between said insulator and said outer end of the shell, and a metal end contact having snap fastener means formed therein and secured around the aperture in the said insulator by a snap interlock engagement with the insulator, another lead wire being clamped between the said end contact and a portion of the insulator.

PAUL O. CARTUN.